Figure 1:
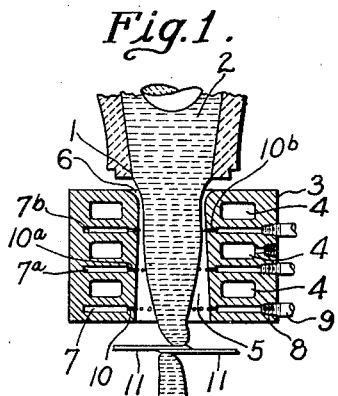

April 5, 1932.  G. E. HOWARD  1,852,719

PROCESS AND APPARATUS FOR FORMING MOLTEN GLASS

Filed March 15, 1929.  2 Sheets-Sheet 1

Witness:
Jas. G. White

Inventor
George E. Howard
by Brown & Parham
Attorneys

April 5, 1932. G. E. HOWARD 1,852,719
PROCESS AND APPARATUS FOR FORMING MOLTEN GLASS
Filed March 15, 1929 2 Sheets-Sheet 2

Witness:
Jas. G. White

Inventor
George E. Howard
by Brown & Paulman
Attorneys

Patented Apr. 5, 1932

1,852,719

UNITED STATES PATENT OFFICE

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE

PROCESS AND APPARATUS FOR FORMING MOLTEN GLASS

Application filed March 15, 1929. Serial No. 347,287.

The process of controlling the discharge of molten glass, which forms part of the subject matter of the present invention, is an improvement on the process wherein successive portions of a descending stream or column of molten glass are first brought into a more or less retarding or husbanding contact with surfaces, and are then suspended from or below such surfaces, the shaping imparted to the glass by contact with said surfaces being thus modified and the final shape of the glass being determined by the gravity stretch effective on the suspended portions of the glass.

Such processes are applicable, inter alia, to mold charge formation, but may also be used for controlling the section of the column or of portions thereof.

In processes of this general character, shape variations may be effected by variations in the time relation between the retarding or husbanding phase and the gravity stretch phase, and also by variations in the time relation between the shear cut and the retarding or husbanding phase and/or the gravity stretch phase.

In the process which forms part of the subject of the present application I greatly increase the range of shape variation by employing a variable control of the frictional resistance between the contact surfaces and the surface of the molten glass.

This controlled variation in the frictional resistance which the contact surfaces offer to the surface of the molten glass may be in the time of its application, the location of its application, the effective area thereof, and/or its degree of such frictional resistance.

By the use of my controlled variable frictional resistance in the practice of the process hereinafter described, I am enabled, to some extent, to control the character and extent of formation of chilled skin upon the glass which ultimately forms the mold charge. While a skin upon the outer portion of the glass will be created because of contact of the glass with the instrumentalities used, I avoid or minimize to a large extent any deleterious effects of this skin formation, first by avoiding undue attenuation of the glass and thus maintaining a relatively large hot interior portion thereof and second by providing a reheating period during which all portions of the glass forming the charge are out of contact with any chilling instrumentalities.

Other features of novelty in my present process will appear from the following description.

The new and improved apparatus which also forms a part of my present invention provides means for performing my present process in the formation of mold charges, and the same may also be used in connection with other processes for forming the masses of glass.

In the accompanying drawings wherein I have illustrated the working of my new and improved process for the purpose of forming mold charges in connection with my new and improved apparatus, Fig. 1 is a view in vertical section showing the first phase in the cycle of production of a mold charge by the use of one form of apparatus that the invention may provide, the severing of the preceding charge having just occurred and the shears having not yet been opened or retracted out of the way, and Figs. 2 to 7, inclusive, illustrate succeeding phases in the process.

Figs. 8 to 13, inclusive, illustrate phases of the process worked in connection with a somewhat different form of apparatus.

Referring first to Figs. 1 to 7, inclusive, 1 represents the submerged discharge outlet of a receptacle containing a supply of molten glass, such as a glass melting tank or a shallow extension of the same.

2 illustrates the column or stream of glass descending or flowing from the outlet 1.

The descent of the glass may be in the form of a continuously flowing stream or the discharge may be intermittent or at a varied rate.

3 represents an annular receiver which may be of any suitable form and material, as metal or graphite. The receiver may be in one piece or partible.

I have illustrated the receiver as of substantially cylindrical form, the body of the receiver being preferably internally chambered, as at 4, for the passage therethrough of a suitable cooling fluid, such, for instance, as water, which may be admitted to the chamber or chambers and withdrawn therefrom in a manner well known in the art.

The central opening or bore 5 of the receiver may be outwardly flared at its upper end, as at 6, to better receive the downwardly moving column of glass without causing it to pile up or swell out by contact with the upper end of the receiver.

The bore 5 of the receiver 3 is preferably of downwardly enlarging diameter, so that through the instrumentalities hereinafter described the frictional contact between the surfaces of the descending column of glass and the wall of the receiver may be maintained under complete and yet variable control.

At one or more levels in the bore of the receiver means are provided for controlling, relieving and varying the frictional contact between the wall of the receiver and the surface of the glass.

For this purpose I provide means for varying the friction between the glass and the receiver wall.

Thus at different levels of the receiver, such as adjacent to the lower end of the latter, intermediate of the latter, and adjacent to the upper end thereof, I provide annular manifold passages, 7, 7a, and 7b, respectively, each of which is adapted to be connected, as by a port 8 and a pipe 9, to a controlled supply of sub-atmospheric pressure and atmospheric pressure and/or superatmospheric pressure, such as is found in modern glass factories.

Small ports 10, 10a and 10b, arranged in annular series, connect the manifolds 7, 7a and 7b, respectively, with the bore 5 of the receiver 4, said ports being of too small diameter to permit the entrance thereinto of the glass. Thus I may use ports of substantially the size of the air holes which are provided in glass molds in which lettered ware is made to permit of the escape of air which would otherwise be entrapped in the letter-depressions in walls of the molds.

However, the wall of the receiver, at least between the manifold and the bore, may be of porous material so that the air will pass through the same either in the application of partial vacuum, atmospheric pressure or superatmospheric pressure.

11 represents the shears which may be of any of the well-known types in common use in the glass industry, but preferably of the type which are advanced under the lower end of the bore to close and sever the glass and are retracted from such position as they open.

The shears are arranged to cut in a plane beneath the receiver but spaced sufficiently below the lower end of the latter to prevent smearing or riveting of the sheared stub.

12, (see Fig. 2), represents a pillow block which is mounted on an operating arm 13 and is arranged to be periodically positioned at the lower end of the bore of the receiver 4 after the shears have severed a mold charge and have been retracted.

The receiver 3 is preferably located close to the outlet 1 and is of such length relative to the diameter of the outlet that the lower end of a column of glass, of suitable viscosity for the operation to be performed, issuing from the outlet will reach substantially to the lower end of the bore 5 before the stream attenuates excessively. The preferred dimensions of a receiver suitable for an outlet of a given size may vary according to viscosity of the glass, the rapidity of the operations to be performed and the character of the discharge of the glass through the outlet. In the case of fairly hot glass, which is preferably used in the practice of my method, flowing in a steady constant stream from the outlet, it is preferable that the lower end of the receiver be not removed from the outlet 1 a distance more than two and one-half times the diameter of the outlet. The foregoing statements of the preferred relative dimensions of the parts are not to be taken as limitations, as my apparatus and method are useful in the feeding of glass when these dimensions are not observed but are stated as dimensions which are believed to give the best results in making high quality glassware.

My improved process as illustrated by Figs. 1 to 7 inclusive, is as follows:

Assuming the status illustrated in Fig. 1 wherein the shears have just closed and severed the mold charge last produced and shown at 15 in Fig. 1 as dropping down toward the waiting mold or other container, the sheared stub is partially supported by the closed shears.

Figure 2:
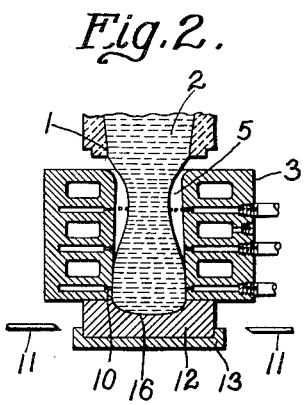

Referring next to Fig. 2, as the shears open and are withdrawn to their retracted position, the pillow block 12 is positioned at the lower end of the bore 5 of the receiver 4, preferably sealing the lower end of the receiver and supporting the glass which forms the lower end of the sheared stub so that the glass will fill out the rounded cavity 16 of the pillow block and the cross sectional area of the lower part of the bore of the receiver.

The curve of the sides of the cavity of the pillow block should be tangent to the bore of the receiver and such as to mate and merge with the lower end of the receiver bore without a corner or offset, thus preventing any pinching of the glass or the formation at the end of the pendant mass of glass of sharp corners which would chill unduly.

As the glass accumulates in the bore 5, the level of the same in contact with the wall of the bore will rise above the level of the ports 10 and sub-atmospheric pressure is applied to said ports, thus tending to hold the adjacent glass in frictional contact with the wall of the bore, so as to hinder, that is either halt or retard such movement, depending upon the degree of vacuum used.

The bore may if desired be made of constant diameter, but I prefer to make it of downwardly increasing diameter, at least as far as the lower ports 10, so that the adhesion of the glass to the wall of the receiver or the frictional contact between the glass and the receiver will be under control and may be put into effect, regulated or relieved immediately in response to the changes in the fluid pressure applications at the ports.

Figure 3:
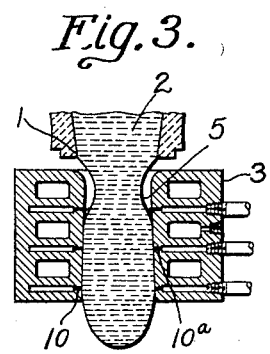

After the glass has been brought into frictional contact with the wall of the bore, adjacent to the ports 10, the pillow block 12 is removed, permitting the pendant glass to bag downwardly and stretch under the influence of gravity, as illustrated in Fig. 3.

Meanwhile, owing to the fact that the flow of glass from the outlet 1 exceeds the amount of glass leaving the bore 5 below the ports 10, the level of glass filling the full cross sectional area of the receiver bore will ascend, preferably eventually rising above the intermediate ports 10a, as illustrated in Fig. 3.

It is evident that glass will flow down the interior of the mass of glass, filling out and downwardly stretching the inclosing skin of the mass which depends below the receiver, but at this stage the input of glass in the receiver will exceed the flow of glass out of the receiver.

When the level of glass in contact with the wall of the receiver rises above the intermediate port 10a, the partial vacuum in the lower ports 10 is relieved and replaced either by atmospheric pressure or by a slightly superatmospheric pressure, thus relieving the frictional contact of the glass with the wall of the lower portion of the bore of the receiver. Superatmospheric pressure may be required to prevent sticking.

Partial vacuum is meanwhile caused in the ports 10a, thus holding the glass in frictional contact with the wall of the bore adjacent to the level of the ports 10a, either halting the movement of the adjacent glass or retarding its movement.

Figure 4:
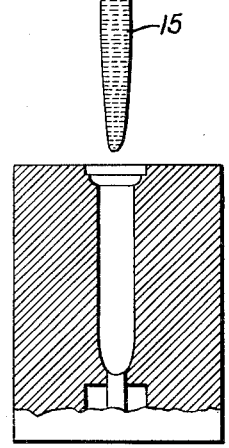

As illustrated in Fig. 4 the glass will show an increased tendency to bag downwardly, pulling out of contact with the wall of the lower portion of the bore adjacent to the ports 10.

The natural tendency of the pendant mass of glass would be to form a ball or roughly rounded mass at its lower end, followed by an attenuated tail or neck, the point of the beginning of attenuation being at a fairly well defined point below the lowest point of contact of the glass with the receiver. I prevent such ball and tail or neck formation by a control which may include the simple expedient of changing vertically the position of the lowest point of contact between the glass and the wall of the receiver prior to the time such tendency to attenuate becomes excessive. This in effect will cause the point at which the tendency to attenuate becomes pronounced to shift vertically, and by the suitable regulation of the time of varying this point I am enabled to accurately control the shape of the charge. The necessary formation of a chilled skin upon the glass by contact with the receiver may be made use of as an aid to this control of a shape.

Figure 5:
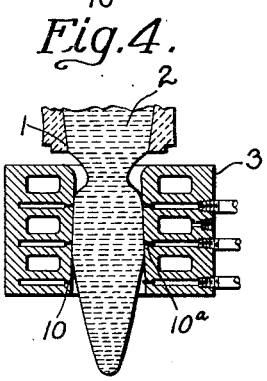

As the glass accumulates in the receiver above the level of the ports 10a, due to the frictional contact with the wall of the bore in which the glass is held by the partial vacuum applied at said ports, the glass level will rise in contact with the wall of the bore above the upper ports 10b, as illustrated in Fig. 4, whereupon the subatmospheric pressure is relieved from the ports 10a and replaced with atmospheric pressure or superatmospheric pressure at said ports, and partial vacuum is meanwhile applied to the ports 10b, producing the status illustrated in Fig. 5 wherein the glass is shown as held in frictional contact with the bore adjacent to the ports 10b, but released from such contact below said ports, thus permitting a further downwardly stretching of the pendant mass of glass. The partial vacuum in the ports 10b may be sufficient to halt the movement of the glass or to merely retard such movement.

It is evident that the release of sub-atmospheric pressure at ports 10, for example, may occur immediately after the glass has filled the bore up to the ports 10a and partial vacuum has been applied at the ports 10a. The release at ports 10 may take place when the glass level has risen to any point above the ports 10a and before it reaches the ports 10b. Such variations in the time of release at ports 10 would cause a variation in time of stretching and also in the effect of such stretching.

Again the release of partial vacuum at ports 10 may be delayed until the glass level rises to a point above ports 10b, and its release at ports 10 and 10a may occur at very close intervals, thus causing still other changes in the final shape.

Again the release at ports 10 may be delayed until the glass level rises above ports 10b, the partial vacuum being applied at the latter ports, the ports 10a not operating to affect the result. In this case the operation would be a two-point contact at ports 10 and 10b.

These and many other combinations of release could be effected by means of suitable timing means well known in the art to cause control of the shape not possible in any process or by any apparatus known in the prior art.

Figure 6:
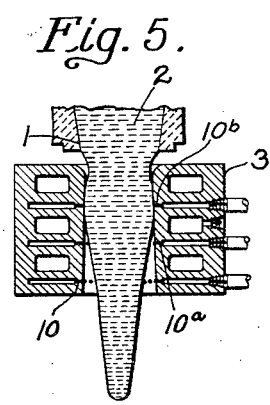
Figure 7:
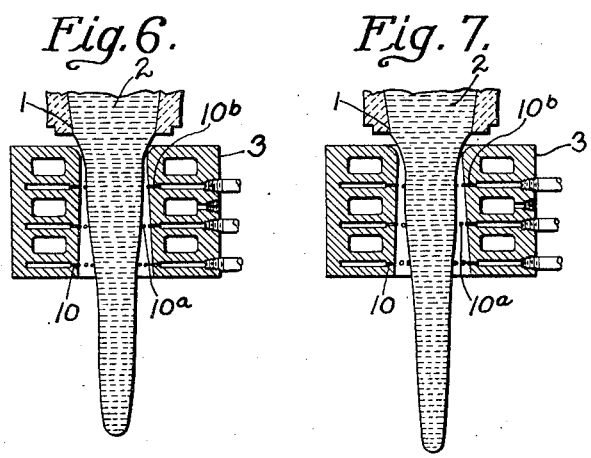

When the desired degree of stretching has taken place, the partial vacuum is relieved from the ports 10b and replaced by atmospheric pressure or superatmospheric pressure, thus relieving the glass from frictional support by the bore of the receiver, and causing the glass to further stretch and attenuate out of contact with walls of the bore, as shown in Fig. 6 and Fig. 7.

The shears now close and cut off the mold charge pendant below the receiver, temporarily supporting the stub depending from the outlet 1, the time of such support being controllably regulated, and thus the cycle of operation is completed. See Fig. 1.

It is well known that the glass flowing from a container through a submerged orifice has a velocity in the center of the stream different from the velocity of the glass at or adjacent to the orifice wall.

The frictional resistance between the glass and the wall of the orifice is different than the frictional resistance between the particles of the glass itself.

Also the center of the section of downwardly flowing glass is of different temperature than the surrounding outer portions of side glass owing to the more rapid extraction of heat from the latter by radiation and conduction to the normally cooler material of the orifice wall.

Consequently in a stable condition this difference of friction is constant, not subject to control, and a certain shape will be assumed by the pendant glass. Such shape will be constant and is determined by the physical laws governing the characteristics of molten glass.

Moreover shaping variations may be effected by the regulation of the degree of frictional resistance through the control of the sub-atmospheric applications.

Again by controllably varying the time during which the stub is supported by the shears after severance, further variations in shape may be obtained.

Again by varying the time interval between the opening of the shears and the positioning of the pillow block at the lower end of the receiver further variations of shape may be effected.

Again by variations in the time of pillow block removal relative to the closing of the shears, and, again relative to the opening of the shears, further shape variations may be effected.

Timing means for effecting such variations are of course well known in the art.

It is evident that by regulating and varying the time relation between the phases wherein successive portions of the glass are held or retarded in frictional contact with the wall of the receiver bore and wherein they are allowed to hang subject to the influence of gravity, the shape of the depending mass may be controlled within a relatively wide range, and that this range may be greatly enlarged by variation in the periods within which partial vacuum is applied at the several series of ports and the relative timing of such applications.

Any number of annular series of ports may be provided but the three series illustrated are considered sufficient to ordinarily obtain satisfactory results.

It is of course not necessary to entirely halt the movement of the surfaces of the glass in frictional contact with the wall of the bore, but the application of partial vacuum may be employed to retard instead of entirely halt the movement of the exterior portions of the glass, and the degree of such retardation may also be used for the control of the shaping of the mold charges.

Referring now to Figs. 8 to 13, inclusive, I show the receiver provided with but one series of ports 10c connected at their inner ends to the manifold passage 7c which is adapted to be supplied with partial vacuum, atmospheric pressure and/or superatmospheric pressure by means of the port 8a and pipe 9a.

The ports 10c are preferably located at a substantial distance above the lower end of the receiver bore.

The pillow block 12a is shown provided with a lining inset 17 which is of material differing in heat conductivity from the material of the pillow block—of greater or of less conductivity. The area, shape and thickness of such lining may also vary. These variations in material, thickness, shape and area affect the shape of the mold charge and particularly the contour of its lower end.

Figure 8:
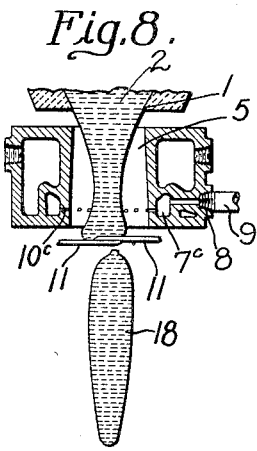

The first phase of the operation of the process is illustrated in Fig. 8, the mold charge last produced, shown at 18, having been severed by the closing of the shears 11 and the sheared stub resting on the shears.

Figure 9:
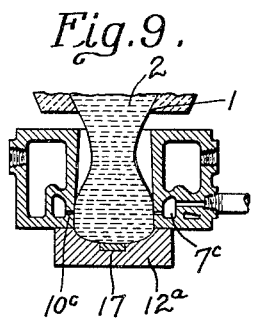

In the next phase, illustrated in Fig. 9, the shears have been retracted and the pillow block 12a positioned below the outlet, causing the lower end of the stub to swell out and fill the full cross-sectional area of the bore of the receiver to a point above the ports 10c.

The pillow block is then removed and partial vacuum meanwhile applied to the ports 10c, thus, depending upon the degree of vacuum, either preventing the downward movement of the outer portions of the glass or merely retarding such movement to a greater or less degree as desired.

Figure 10:
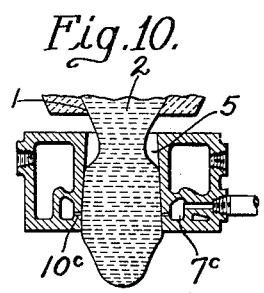
Figure 11:
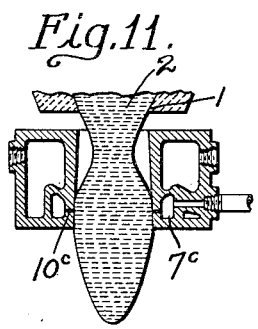
Figure 12:
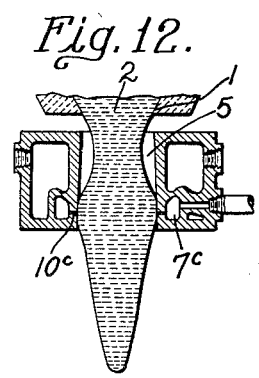

The result is the next phase, illustrated in Fig. 10, wherein the lower portion of the glass gradually bags downwardly, this downward bagging continuing, as shown in Figs. 11 and 12, and the glass flowing down through the interior of the mass of glass and filling out the enclosing skin.

Figure 13:
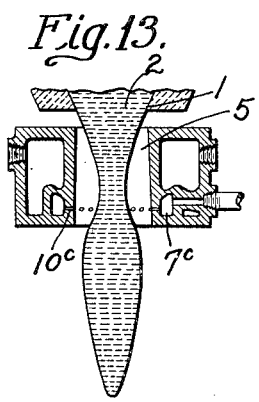

In the next phase, illustrated in Fig. 13, the partial vacuum in the ports 10c is relieved and replaced by either atmospheric pressure or superatmospheric pressure, thus releasing the mass of glass from its support and allowing it to stretch downwardly.

The next phase is the closing of the shears to cut off the mold charge depending below the outlet, as illustrated in Fig. 8.

It is evident that a wide range in variations of shape may be obtained by varying the time relation between the phases wherein the outer portions of successive portions of the glass are supported either with an entire cessation of movement or with a greater or less retardation of movement and are subjected to the stretching influence of gravity Another manner in which my process may be worked in connection with this apparatus is by employing alternate applications of partial vacuum and atmospheric pressure or superatmospheric pressure to the surfaces of the glass through the ports 10c, varying the time intervals between vacuum and atmospheric pressure applications, or vacuum and superatmospheric applications, thus regulating and variably controlling the movement of the outer portions of the glass relative to the movement of the interior portions of the mass.

It is evident that by this means a considerable range of mold charge shapes may be produced, with conditions of temperature, etc., remaining constant.

The bore 5 being downwardly enlarging, it is evident that upon release of subatmospheric pressure the mass of glass in the bore 5 is free to descend without any frictional resistance with the sides of the bore. With even a small descent, a space will develop between the glass and the wall of the bore.

Contact with the bore by the glass could then not be reestablished unless the air in the space thus developed could be exhausted and in addition the glass could swell out to meet the wall of the bore.

Owing to the limited size of the port openings 10c, such exhaustion of air would not be possible for even a very minute space so developed between the glass and the bore.

Also every particle in the charge would tend to descend with equal speed in accordance with the law of gravity.

If, however, frictional resistance is applied to the mass of glass below the ports 10c, for instance, then the glass in the bore will not descend freely but the head of glass will exert a swelling tendency due to hydrostatic pressure.

It may be desirable, therefore, that the bore 5 be downwardly enlarging as far as ports 10c in order to free the glass from friction with the sides of the bore 5 when sub-atmospheric pressure in 10c is changed to atmospheric or superatmospheric pressure, but to avoid the inverted cone of glass descending entirely and causing the space beforementioned, it is desirable that some frictional resistance be given to the glass at or below the ports 10c.

This will allow some hydrostatic pressure to develop and cause the lower end of the glass to contact with the bore while the upper part is falling.

The bore 5 therefore in Figures 8–13 may be downwardly enlarging only to the ports 10c. Below that it may be either straight or slightly downwardly contracting in order to cause the hydrostatic pressure to swell the glass at ports 10c and thus avoid a space developing between the glass and the bore 5 at ports 10c.

While, for the purpose of more clearly illustrating the principles of my invention, I have illustrated and described my process and apparatus as used for mold charge formation, it is obvious that either the process or apparatus or both may be employed for variably controlling the characteristics of a tubular or solid descending column or mass of molten glass and especially as to its cross sectional size and shape.

What I desire to claim is:—

1. The process of controlling the shape of a descending solid mass of molten glass which comprises hindering the movement of the glass by controlled frictional resistance, and varying such shape by regulating such frictional resistance.

2. The process of controlling the shape of a descending mass of molten glass which comprises hindering the movement of the mass by frictional resistance effective on the lateral surface of the mass, imparting the final shape to the mass by means of the stretching action of gravity on the glass while suspended, and regulating such shape by varying the frictional resistance.

3. The process of controlling the shape of a descending mass of molten glass which comprises hindering the movement of the mass by frictional resistance effective on the lateral surface of the mass, imparting the final shape to the mass by means of the stretching action of gravity on the glass while suspended, and regulating the shape by varying the gravity stretch phase.

4. The process of forming a shaped mold charge from a descending column of molten glass which comprises hindering the movement of a portion of the column by means of partial vacuum applied to its lateral surface, and imparting the final shape to the mold charge by means of the stretching action of gravity on the glass while suspended.

5. The process of forming a shaped mold charge from a descending column of molten glass which comprises controlling the movement of a portion of the column by alternate applications of sub-atmospheric pressure and a greater pressure to the lateral surface of the glass alternately to hinder such movement and to relieve sub-atmospheric pressure on the glass, and imparting the final shape to the mold charge by means of the stretching action of gravity on the glass while suspended.

6. The process of forming a shaped mold charge from a descending column of molten glass, which comprises hindering the movement of a portion of the column by means of frictional contact of the lateral surface of the column, imparting the final shape to the mold charge by means of the stretching action of gravity on the glass while suspended, and regulating said shape by varying the duration of application of such frictional contact.

7. The process of forming a shaped mold charge from a descending column of molten glass which comprises hindering the movement of a portion of the column by means of frictional contact of the lateral surface of the column, imparting the final shape to the mold charge by means of the stretching action of gravity on the glass while suspended, and regulating said shape by varying the intensity of such frictional contact.

8. The process of forming a mold charge from a descending column of molten glass which comprises hindering the movement of a portion of the column by frictional contact with a surface, regulating the skin formation on said glass by varying the area of such contact, and imparting the final shape to the mold charge by means of the stretching effect of gravity on the mass of glass while suspended.

9. The process of forming a mold charge from a descending column of molten glass which comprises hindering the movement of a portion of the column by frictional contact with a surface, regulating the skin formation on said glass by varying the intensity of such contact, and imparting the final shape to the mold charge by means of the stretching effect of gravity on the mass of glass while suspended.

10. The process of forming a mold charge from a descending column of molten glass which comprises hindering the movement of a portion of the column by frictional contact with a surface, regulating the skin formation on said glass by varying the duration of such contact, and imparting the final shape to the mold charge by means of the stretching effect of gravity on the mass of glass while suspended.

11. The process of forming a mold charge from a descending column of molten glass which comprises hindering the movement of a portion of the column by frictional contact with a surface, regulating such contact by varying the elevation thereof, and imparting the final shape to the mold charge by means of the stretching effect of gravity on the mass of glass while suspended.

12. The process of forming a mold charge from a descending column of molten glass which comprises hindering the movement of a portion of the column by frictional contact with a surface, regulating such contact by varying the time and the elevation thereof, and imparting the final shape to the mold charge by means of the stretching effect of gravity on the mass of glass while suspended.

13. In apparatus for forming shaped mold charges from a descending column of molten glass, the combination with a receptacle for the molten glass having a discharge outlet, of a receiver having a bore located below the outlet, and means for causing frictional contact between the glass and the wall of said bore, said bore having a downwardly increasing area as far as the location of said means, said means being located a substantial distance above the lower end of said bore.

14. In apparatus for forming shaped mold charges from a descending column of molten glass, the combination with a receptacle for the molten glass having a discharge outlet, of a receiver having a bore located below said outlet, pneumatic means for obtaining frictional contact between the internal wall of said receiver and the glass to hinder the movement of the glass through the receiver, and shears working below said receiver.

15. In apparatus for forming mold charges from a descending column of molten glass, the combination with a receptacle for the molten glass having a discharge outlet, of a receiver having a bore located below the outlet, means for obtaining frictional contact between the glass and the wall of the receiver, means for varying the elevation of such contact relative to the bore of the receiver, and shears working below the receiver.

16. In apparatus for forming shaped mold charges from a descending column of molten glass, the combination with a receptacle for the molten glass having a discharge outlet, of a receiver having a bore located below said outlet, shears to cut the glass working below the receiver, and a closure arranged to be positioned below the receiver to support the sheared stub after the shearing operation, said closure having the central portion of its contact surface of material of different heat-conductivity than the remainder of such contact surface.

17. The method of feeding molten glass in a mold charge of regulably controllable shape, comprising the steps of discharging molten glass downwardly in a column from a downwardly opening discharge outlet into the bore of an open-ended annular receiver below and in alignment with said outlet, applying sub-atmospheric pressure through the inner walls of the receiver at different levels in the latter selectively to hinder the rate of downward sag of glass into suspension below the lower end of the receiver, relieving such sub-atmospheric pressure after a predetermined period of application thereof, and severing a mold charge from the glass in suspension below the receiver when such suspended glass has attained the shape desired.

18. The method of feeding molten glass in a mold charge of regulably controllable shape, comprising the steps of discharging glass downwardly in a column from a downwardly opening outlet into the bore of an open ended annular receiver below and in alignment with said outlet, temporarily supporting the lower end of said column adjacent to the lower end of the receiver to cause the lower end portion of said column to be enlarged sufficiently to contact frictionally with the inner walls of the lower portion of the receiver, removing the under-support, and controlling the rate of downward sag of glass from said column below the lower end of said receiver by applying sub-atmospheric pressure through the inner walls of the receiver to the glass therein at progressively higher levels in the receiver to cause progressively higher portions of the glass in the receiver to be brought into and maintained in frictional contact with the inner walls of the receiver, relieving such sub-atmospheric pressure at different levels in the receiver after predetermined periods of application thereof, thereby aiding in controlling the shape of the downwardly sagging glass in suspension below the receiver, and severing a mold charge from the suspended glass below the receiver when such suspended glass has attained the desired shape.

19. Apparatus for forming mold charges of regulably controlled shape, comprising a receptacle for molten glass having a downwardly opening discharge outlet, an open ended annular receiver disposed below and in alignment with said outlet, a removable bottom closure for the lower end of said receiver, said bottom closure being adapted to support the lower end of a column of glass that has been discharged downwardly from said outlet through the bore of said receiver to cause glass at the lower end of the column to pile up on the bottom closure into frictional contact with the inner wall of the lower portion of said annular receiver, said annular receiver having means located at a plurality of different levels for applying sub-atmospheric pressures to different portions of the glass column in said receiver to cause frictional contact of such portions of the glass column with the adjacent portions of the bore of the receiver and thereby to aid in controlling the shape of the glass in suspension below the receiver when such bottom closure has been removed, and shears timed to sever a mold charge from the glass in suspension below the receiver when such suspended glass has attained the desired shape.

20. Apparatus for forming mold charges of regulably controlled shape, comprising a receptacle for molten glass having a downwardly opening discharge outlet, an open-ended annular receiver disposed below and in alignment with said outlet, a removable bottom closure for the lower end of said receiver, said bottom closure being adapted to support the lower end of a column of glass that has been discharged downwardly from said outlet through the bore of said receiver to cause glass at the lower end of the column to pile up on the bottom closure into frictional contact with the inner wall of the lower portion of said annular receiver, said annular receiver having means located at a plurality of different levels for applying sub-atmospheric pressure to different portions of the glass column in said receiver to cause frictional contact of such portions of the glass column with the adjacent portions of the bore of the receiver and thereby to aid in controlling the shape of the glass in suspension below the receiver when said bottom closure has been removed, said receiver also having means for relieving the sub-atmospheric pressure at any of said levels in the receiver after a predetermined period of application of such sub-atmospheric pressure, to further aid in controlling the rate of downward sag of glass from the column into suspension below the receiver, and shears timed to sever a mold charge from the suspended glass when such suspended glass has attained the desired shape.

Signed at Pittsburgh, Pa., this 18th day of January, 1929.

GEORGE E. HOWARD.